July 31, 1962      J. M. WOODLEY      3,046,690
ATTRACTOR MOUNTING FOR FISHHOOK
Filed July 6, 1960
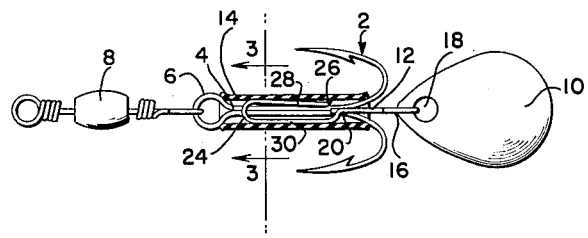
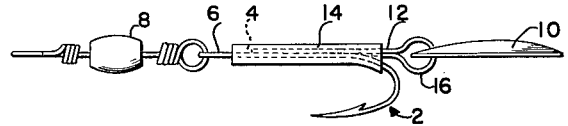
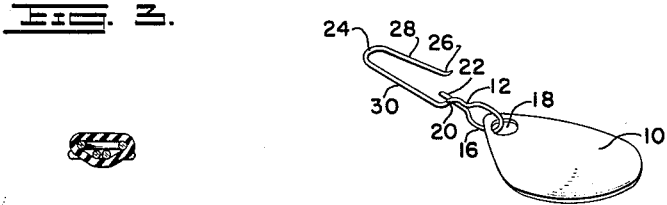
INVENTOR
JAMES M. WOODLEY
BY
ATTORNEY

United States Patent Office 3,046,690
Patented July 31, 1962

3,046,690
ATTRACTOR MOUNTING FOR FISHHOOK
James M. Woodley, Maplewood, La., assignor to Dido Lures, Inc., Houston, Tex., a corporation of Texas
Filed July 6, 1960, Ser. No. 41,187
1 Claim. (Cl. 43—42.38)

This invention relates to fishing lures and, more particularly, to a connection assembly for mounting an attractor on the shank of a fishhook.

The primary object of the invention is to provide for the quick assembly of a combined fishhook and attractor, requiring minimal and unskilled labor for rapidly producing and assembling the components.

Another object is to provide connector parts whereby various fish attractors may be mounted on a conventional hook shank, and further providing for easy interchange of attractors on the same hook shank. A further object is to provide an attractor connector, including a flexible plastic sleeve retainer, which will not scare away or alarm a wary, nibbling or lightly striking fish.

These and other objects will be apparent from the following specification and drawing, in which:

FIG. 1 is a plan view, partly in longitudinal cross section, showing the attractor mounting assembled;

FIG. 2 is a side elevation of the assembly shown in FIG. 1;

FIG. 3 is a vertical cross section along the line 3—3 of FIG. 1; and,

FIG. 4 is a perspective view showing the bent wire connector attached to an attractor.

Referring now to the drawing, in which like reference numerals denote similar elements, a conventional two-point hook 2 is shown with the usual double shank 4 and eye-bend 6 to which a barrel swivel 8 may be connected. The invention relates to the elements for connecting an attractor, such as blade 10, to the hook shank, the elements consisting entirely of a bent wire 12 and a flexible plastic sleeve 14.

One end of wire 12 is bent to form a closed loop 16 which passes through the eye opening 18 in attractor 10. The wire at the base of loop 16 has an offset bend 20 beneath which the adjacent free end 22 of the wire passes. If desired, the free end 22 of the wire may be upwardly offset, but this is not necessary because the plastic sleeve will prevent these parts from spreading sufficiently to open loop 16. The remainder of wire 12 is bent as at 24 to form a J, and the leg of the J may be flared slightly outwardly as at 26 to increase the snagging effect of the free end.

In operation, flexible plastic sleeve 14 if first installed over double shank 4 before swivel 8 is attached to eye 6. Next, with attractor 10 connected by loop 16 as shown, J bend 24 of wire 12 is pushed backwardly into sleeve 14 until the free end 26 of wire 12 is well within sleeve 14 so that it snags, like an open safety pin, in the wall of the plastic sleeve. The parts may be disassembled by pinching sleeve 14 inwardly so as to free the end 26 from the sleeve, but otherwise the assembly will remain together as shown.

Wire 12 should, of course, be sufficiently stiff and springy so that the width of the J bend, as measured at the open mouth, crosswise from leg 28 to stem 30 of the J when the wire is not confined is normally wider than the inner diameter of sleeve 14. The specific type of plastic for sleeve 14 is not critical, other than that it should be sufficiently pliable so that it can be pressed into an oval and slid over eye 6, and it should be soft enough so that the free end 26 of the wire will snag into the inner side of the sleeve when rearward tension is applied to loop 16.

Different attractors may be used and, of course, the lure may be embellished by feathers or the like accessories. The invention is not restricted to the precise form shown and described, but is intended to cover various modifications and equivalents within the scope of the following claims:

I claim:

An attractor mounting for fishhooks comprising a fishhook having a shank, a flexible plastic sleeve engaging loosely over the shank, a substantially J-shape spring wire having a stem and a leg engaging in and being surrounded by the sleeve, the free end of the leg being normally divergent from the stem whereby to snag the inner side of the sleeve in response to pulling on the free end of the stem, and means on the free end of the stem for attaching an attractor to the same.

References Cited in the file of this patent
UNITED STATES PATENTS

| | | |
|---|---|---|
| 1,325,530 | Ore | Dec. 23, 1919 |
| 1,522,185 | Hawes | Jan. 6, 1925 |
| 1,546,701 | Bailer | July 21, 1925 |
| 2,214,668 | Erickson | Sept. 10, 1940 |
| 2,502,979 | Moore | Apr. 4, 1950 |
| 2,756,532 | Trester | July 31, 1956 |